United States Patent [19]

Sexton, Jr.

[11] 4,395,662
[45] Jul. 26, 1983

[54] CORRECTION CIRCUITS FOR PROJECTION TELEVISION

[75] Inventor: Charles W. Sexton, Jr., Suffolk, Va.

[73] Assignee: General Electric Company, Portsmouth, Va.

[21] Appl. No.: 267,602

[22] Filed: May 27, 1981

[51] Int. Cl.³ .................................. H01J 29/56
[52] U.S. Cl. .................................. 315/371; 358/60
[58] Field of Search ............... 315/370, 371, 387; 358/60

[56] References Cited

U.S. PATENT DOCUMENTS

4,184,104  1/1980  Shouse, Jr. .................. 315/371
4,352,124  9/1982  Kline ......................... 358/60

Primary Examiner—Theodore M. Blum

[57] ABSTRACT

Correction circuits for a projection television of the type having three picture tubes arranged side by side on a horizontal axis are disclosed. The picture tubes separately display red, green and blue information of a color television picture. A separate projection lens is provided adjacent the face plate of each picture tube for projecting superposed images on a remote screen. Each of the picture tubes is provided with a main deflection yoke for deflecting the generated cathode ray beam of that tube to generate picture images in the usual manner. In addition, each of the picture tubes is provided with a pre-deflection yoke which is driven by one or more correction circuits. These correction circuits, in combination with the pre-deflection yoke, provide scan compensation fields in the paths of the electron beams to provide convergence and raster distortion corrections in the optically projected images. The correction circuits are a trapezoidal correction circuit, a top and bottom pin cushion correction circuit, a side pin cushion correction circuit, and a horizontal width and linearity correction circuit.

16 Claims, 44 Drawing Figures

HORIZONTAL SWEEP INTERVAL

OUTPUT CURRENT WAVEFORM, $I_0$ CAN BE ANY COMBINATION OF THE 4 SHOWN, INCLUDING THE NEGATIVE OF EACH

CORRECTION CIRCUITS FOR PROJECTION TELEVISION

BACKGROUND OF THE INVENTION

The subject invention relates to projection television systems, and more particularly to correction circuits for a projection television of the type having three picture tubes arranged side by side on a horizontal axis.

Figure 1:
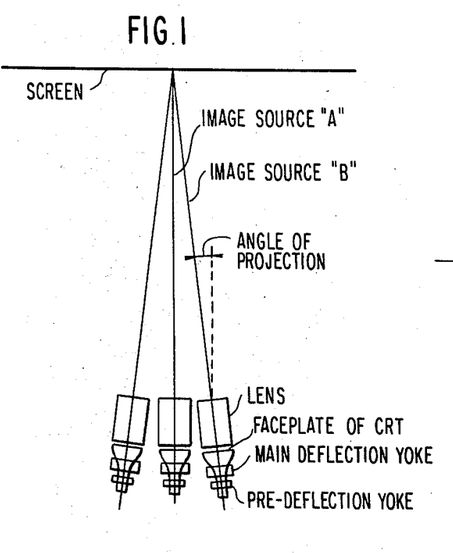
FIG. 1 is a schematic diagram showing the optical arrangement of a projection television system.

In a projection television system, the image generated on the face plate of the picture tube is magnified through a lens and projected on to a screen. In a color projection television system, there are three picture tubes which separately display red, green and blue information of a color television picture. These three picture tubes may be arranged in a triad or side by side on a horizontal axis. In the system for which the correction circuits according to the subject invention are designed, the three picture tubes are arranged side by side on a horizontal axis as shown in FIG. 1 of the drawings.

Figure 2:
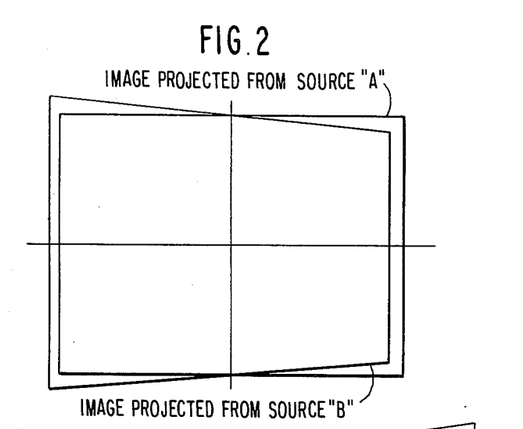
FIG. 2 is an illustration showing the uncorrected images projected on to the screen by sources A and B of FIG. 1.
Figure 3:
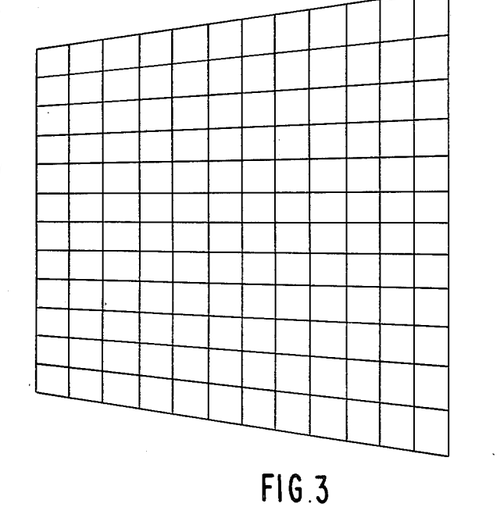
FIG. 3 is a grid illustrating trapezoidal distortion.

In any color projection television, the images of all three picture tubes must be superimposed so that a single image appears on the screen. Each image must be exactly the same size and shape so that the superpositions can be accomplished. In the system shown in FIG. 1, the center picture tube is projected perpendicular to the screen while the two outer tubes are projected at an angle such that superposition is possible. This angular projection causes an optical distortion known as trapezoidal distortion. FIG. 3 is a grid illustrating trapezoidal distortion. As shown in FIG. 3, the vertical left edge is shorter than the vertical right edge. This distortion would be produced from the left picture tube as shown in FIG. 1. FIG. 2 illustrates the uncorrected images projected on to the screen by the center and right picture tubes as illustrated in FIG. 1. The image projected from the left picture tube in FIG. 1 is omitted from FIG. 2 for purposes of clarity. As shown in FIG. 2, the image projected from the center picture tube is perfectly rectangular, while the image projected from the right picture tube suffers from trapezoidal distortion. In addition to the trapezoidal distortion, there is a further optical distortion along the horizontal axis as illustrated in FIG. 2.

Figure 4:
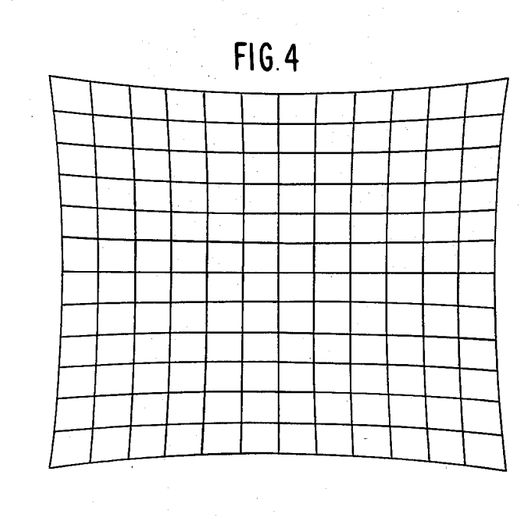
FIG. 4 is a grid illustrating pin cushion distortion.
Figure 5:
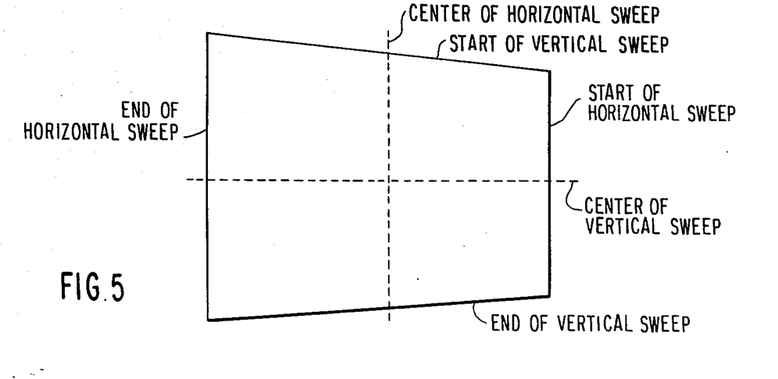
FIG. 5 is a diagram useful in analyzing trapezoidal distortion in terms of the horizontal and vertical sweeps.

Besides the distortions produced by the projection angles of the left and right picture tubes, the uncorrected television image also suffers from a distortion known as pin cushion distortion. FIG. 4 is a grid illustrating pin cushion distortion. This distortion may be characterized as a general concavity of the top and bottom and side edges of the image. In the past, top and bottom pin cushion correction has been accomplished in the main deflection yoke by attempting to modulate and superimpose a horizontal parabola on the vertical sweep current wave form. Side pin cushion correction is usually done by modulating the horizontal yoke current with a vertical parabola. This approach for correctng pin cushion distortion has been inefficient and somewhat lacking in performance. The screen is much larger in a projection television system, and therefore the distortions appear larger and more noticeable.

SUMMARY OF THE INVENTION

It is therefore an object of the present invention to provide correction circuits for a projection television of the type having three picture tubes arranged side by side on a horizontal axis.

It is a more specific object of the invention to provide correction circuits for a color projection television, which correction circuits correct distortions and provide convergence in the optically projected images.

These and other objects of the invention are accomplished by providing a trapezoidal correction circuit, a top and bottom pin cushion correction circuit, a side pin cushion correction circuit, and a horizontal width and linearity correction circuit. The trapezoidal correction circuit generates the wave forms required to correct the optical distortion produced when an image is projected to a flat plane that is not perpendicular to the image source. The wave forms generated are comprised of a saw tooth at the horizontal frequency whose amplitude is modulated by a saw tooth at the vertical frequency. These wave forms produce a linear vertical size change between the start and the end of the horizontal sweep, resulting in no vertical size change at the center of the horizontal sweep. The trapezoidal correction circuit allows independent correction of the top and bottom of the projected image and does not itself introduce any other distortion.

The top and bottom pin cushion correction circuit generates the wave forms required to correct the concavity of the top and bottom edges of the projected image. The top and bottom pin cushion correction circuit produces wave forms which are comprised of a parabola at the horizontal frequency whose amplitude is modulated by a saw tooth at the vertical frequency. The top and bottom pin cushion correction circuit allows independent control for top pin cushion correction and bottom pin cushion correction.

The side pin cushion correction circuits generate the wave forms required to correct the general concavity of the side edges of the displayed image. The side pin cushion correction circuits produce wave forms which are comprised of a saw tooth at the horizontal frequency modulated by a parabola at the vertical frequency. The side pin cushion correction circuits allows independent control for top side pin cushion and bottom side pin cushion.

The horizontal width and linearity correction circuit generate the wave forms required to adjust horizontal width and horizontal linearity for proper convergence. The horizontal width and linearity correction circuits generate wave forms which are comprised of saw tooths and parabolas at the horizontal frequency. The horizontal width and linearity correction circuits allows independent control of width and linearity and also allows independent control of the left and right sides of the picture.

According to the invention, each of the picture tubes is provided with a pre-deflection yoke as well as a main deflection yoke as shown in FIG. 1. The pre-deflection yoke is driven by one or more of the correction circuits of the subject invention. As a result, only a relatively small amount of power is required to accomplish the required corrections. Moreover, the correction adjustments are totally independent of deflection yoke current.

BRIEF DESCRIPTION OF THE DRAWINGS

The foregoing and other objects, advantages and aspects of the invention with be better understood from the following detailed description of the invention with reference to the accompanying drawings, in which.

DETAILED DESCRIPTION OF THE INVENTION

In order to correct trapezoidal distortion in a television sweep system, the following conditions must be met:

(1) At the start of the horizontal sweep, the vertical size must be increased/decreased.

(2) At the end of the horizontal sweep, the vertical size must be decreased/increased.

(3) There must be a linear vertical size change between the start and the end of the horizontal sweep, resulting in no vertical size change at the center of the horizontal sweep. The term "increased/decreased" refers to a television picture tube on opposite sides of the center tube as shown in FIG. 2.

Figure 14:
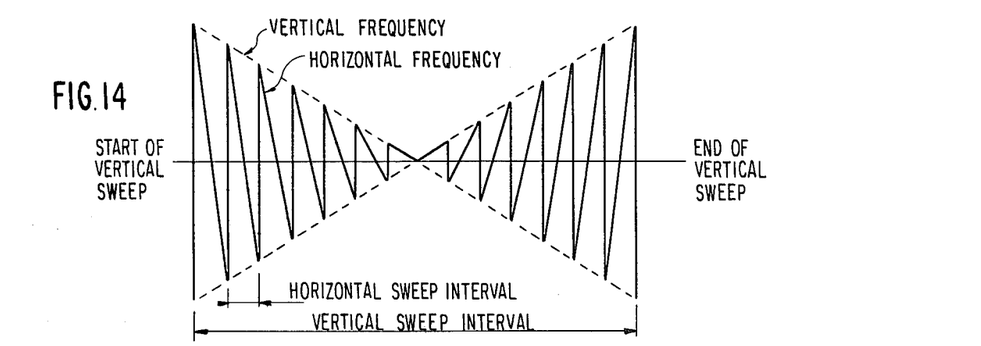

The current wave form which will accomplish the above conditions when driven into the pre-deflection yokes is shown in FIG. 14. The horizontal interval is greatly expanded so that the wave form may be observed. The wave form in FIG. 14 can be described as a horizontal saw tooth whose amplitude is modulated with a vertical saw tooth. The figure shows that the amplitude of the horizontal saw tooth decreases linearly to zero from the start of the vertical sweep to the center of the vertical sweep. The horizontal saw tooth then changes phase by 180° and increases linearly to the end of the vertical sweep.

The pre-deflection yoke is composed of a circular ferrite core to which coils are mounted. The pre-deflection yoke is mounted on the television picture tube directly behind the main deflection yoke as shown in FIG. 1. The coils which are driven with a current having the wave form shown in FIG. 14 are positioned in such a manner as to cause the generated cathode ray beam of the television picture tube to deflect in a vertical direction when current is driven through the coils. When the current wave form shown in FIG. 14 is driven into the pre-deflection yoke, the generated cathode ray beam is moved in such a manner as to cause the image on the face plate of the television picture tube to have a trapezoidal distortion in the opposite direction of the optical trapezoidal distortion. In other words, the optical trapezoidal distortion is cancelled by the induced electrical trapezoidal distortion resulting in an image with no distortion in the vertical direction.

Figure 6:
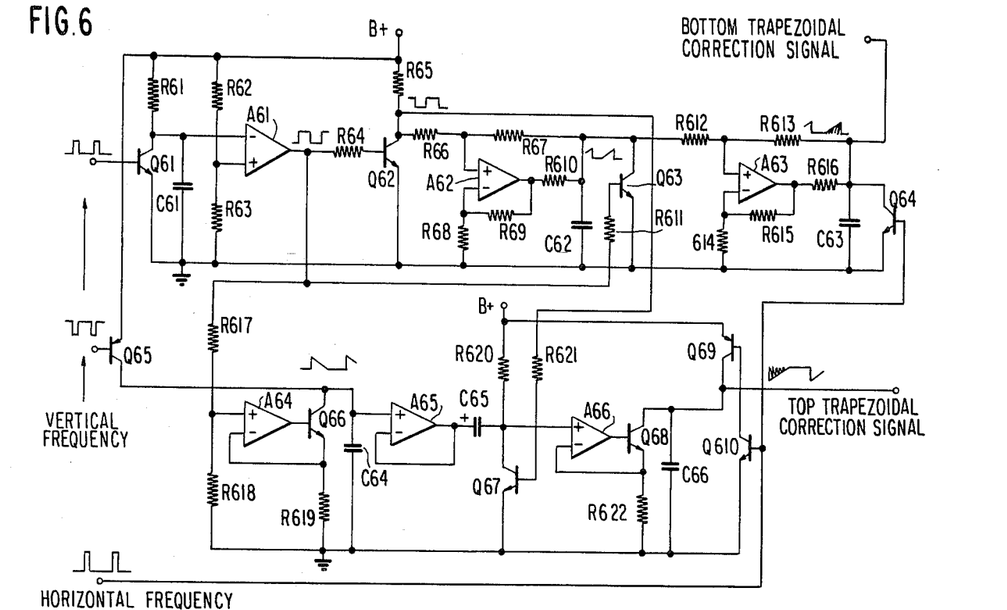
FIG. 6 is a schematic diagram of a trapezoidal correction circuit.

The trapezoidal correction circuit is shown in FIG. 6 and is divided into two parts. The first part is the correction for the first half of the vertical sweep, while the second part is the correction for the second half of the vertical sweep. This division allows indepenent control over the top and bottom of the displayed image.

Figure 7:
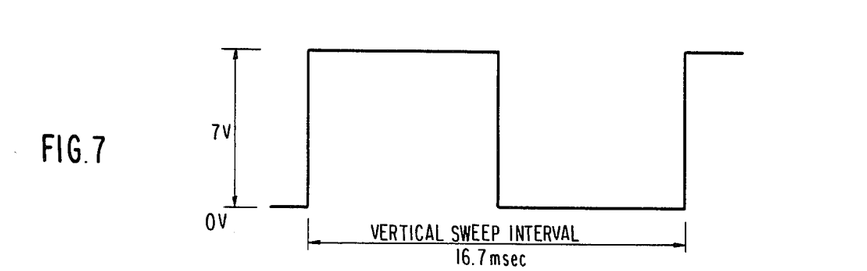
FIGS. 7-14 are waveform diagrams illustrating the operation of the circuit in FIG. 6.
Figure 8:
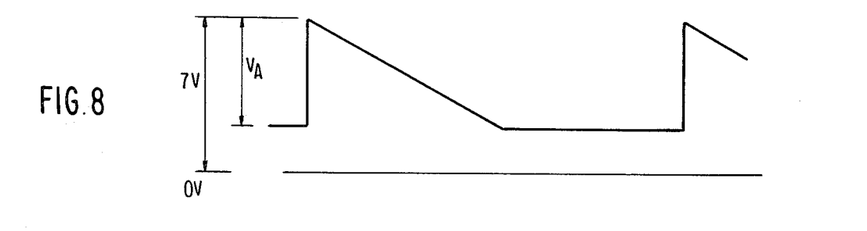

In order to accomplish the independent control over the top and bottom of the displayed image, a square wave is generated at the vertical sweep frequency as illustrated in FIG. 7. This square wave is generated by operational amplifier A61 used as a comparator. The + input of the comparator is biased to a voltage $V_c$ with the resistors R62 and R63 connected as a voltage divider between the source of positive supply voltage B+ and ground. Capacitor C61 connected between the − input of the comparator and ground is charged through resistor R61 from the B+ supply voltage. The charging of capacitor C61 through resistor R61 results in a saw tooth voltage at the − input of the comparator. When the voltage level of this saw tooth is below $V_c$, the output of operational amplifier A61 is high. When the level of the saw tooth is above $V_c$, the output of operational amplifier A61 is low. The time constant R61, C61 is chosen so that the voltage across C61 equals $V_c$ at the center of the vertical sweep. The capacitor C61 is discharged by the transistor Q61 at the end of each vertical speed. The result is a square wave at the vertical frequency at the output of operational amplifier A61 as shown in FIG. 7. This square wave is used to generate the modulating wave form shown in FIG. 9. The square wave is applied to the input of operational amplifier A64 through a resistive voltage divider comprising resistors R617 and R618. The combination of operational amplifier A64, transistor Q66 and resistor R619 form a constant current sink. That is, the current in the collector of transistor Q66 is directly proportional to the voltage at the + input of operational amplifier A64 and to the value of resistor R619. At the end of the vertical sweep, capacitor C64 is charged to the B+ supply voltage through transistor Q65. The square wave at the + input of operational amplifier A64 causes capacitor C64 to be discharged through transistor Q66 with a constant current during the first half of the vertical sweep. During the second half of the vertical sweep, the voltage at the + input of operational amplifier A64 is zero, and no further discharge of capacitor C64 occurs. This results in the wave form shown in FIG. 8. This wave form is then applied to operational amplifier A65 which is a voltage follower in order to lower the impedance across capacitor C64. In order to obtain the modulating wave form shown in FIG. 9, it is necessary to clamp the zero slope portion of this wave form to ground. This is done with capacitor C65, transistor Q67, resistors R620 and R621, and transistor Q62. The transistor Q62 is a simple inverter whose collector is a square wave 180° out of phase with the square wave at the output of operational amplifier A61. This square wave is used to control the clamp, the output of the collector of transistor Q62 being applied to the base of transistor Q67. The collector of transistor Q67 is the output of the clamp and is also the modulating wave form shown in FIG. 9.

Figure 12:
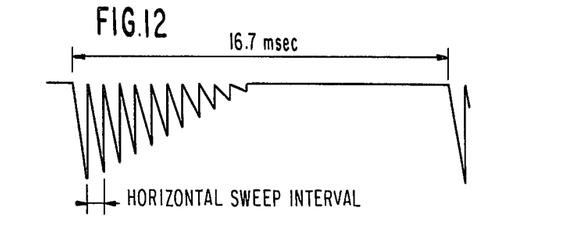

This signal is used to generating the modulated wave form shown in FIG. 12. Operational amplifier A66, transistor Q68 and resistor R22 form a constant current sink similar to the one associated with operational amplifier A64. The modulating wave form is fed to the + input of operational amplifier A66. Capacitor C66 is charged to the B+ supply voltage after each horiziontal sweep interval by transistor Q69. A constant current discharge of capacitor C66 is required in order to have a linear saw tooth of voltage across capacitor C66. In order to have constant current in transistor Q68, the input to operational amplifier A66 must be a constant voltage. Although the voltage at the input of operational amplifier A66 is a vertical saw tooth, the voltage over a single horizontal sweep interval is, for all practical purposes, constant. This approximation yields the modulated wave form shown in FIG. 12. This is the wave form that will correct the top trapezoidal distortion when applied to the set of pre-deflection coils.

Figure 10:
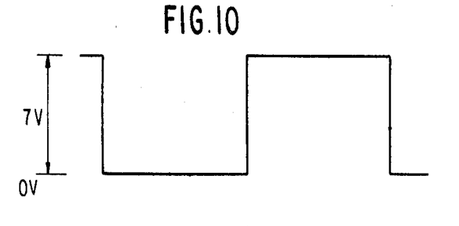
Figures 11, 13:
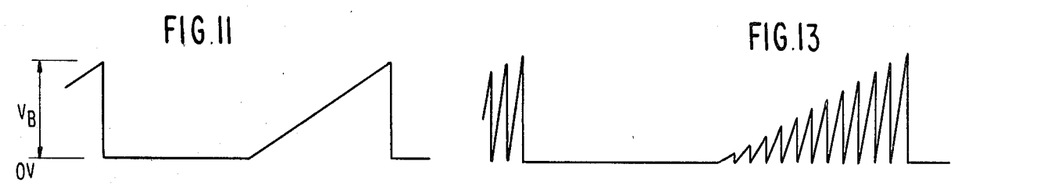

The trapezoidal correction for the bottom half of the vertical sweep is done in a similar manner. The square wave at the output of operational amplifier A61 is inverted by transistor Q62 so that the positive portion of the square wave occurs during the second half of the vertical sweep as shown in FIG. 10. This square wave is applied to a current source made up of operational amplifier A62 and resistors R66, R67, R68, R69, and R610. The current through resistor R610 is directly proportional to the input voltage of R66. This current is used to charge resistor C62 with a constant current during the second half only of the vertical sweep. After each vertical interval, capacitor C62 is discharged with transistor Q63. This results in the modulating wave form for the second half of the vertical sweep which is shown in FIG. 11. This modulating wave form is applied to the input of another current source made up of operational amplifier A63 and resistors R612, R613, R614, R615, and R616. The output of this current source is used to charge capacitor C63 through resistor R616. The capacitor C63 is discharged by transistor Q64 after each horizontal interval. Again, for all practical purposes, the input to operational amplifier A63 is constant over each horizontal interval so that the voltage across capacitor C63 is a linear horizontal saw tooth modulated with the vertical saw tooth as shown in FIG. 13. This is the wave form that will correct the bottom trapezoidal distortion when applied to the coils of the pre-deflection yokes.

The two corrections for top and bottom trapezoidal distortion are added together resistively and applied to an amplifier whose load is the pre-deflection yokes. Mor specifically, the resistively added top and bottom trapezoidal correction signals are amplified and applied to one of the left or right picture tubes as illustrated in FIG. 1, and this same combined signal is inverted and amplified and applied to the other of the left or right picture tubes. No trapezoidal correction signal is applied to the pre-deflection yoke of the center picture tube as shown in FIG. 1.

Figure 27:
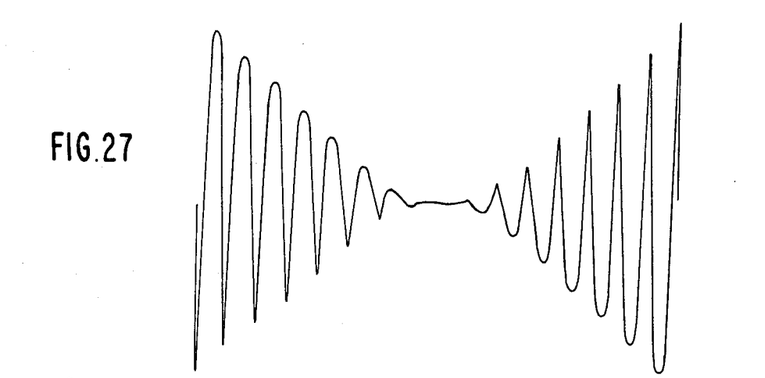

With reference to FIG. 4, it will be appreciated that pin cushion distortion is parabolic in nature. In order to correct this distortion, a modulated parabolic wave form is required. For top and bottom pin cushion correction, the wave form must be a periodic horizontal parabola, amplitude modulated with a vertical saw tooth. This wave form is shown in FIG. 27. At the start of the vertical sweep, the peak to peak amplitude of the horizontal parabola is at its maximum. Its peak to peak amplitude decreases linearly to zero at the center of the vertical sweep, changes phase by 180° and increases linearly to a maximum amplitude at the end of the vertical sweep. When this wave form is applied to the proper windings in the pre-deflection yokes, top and bottom pin cushion correction is provided. It is desirable to have independent control of the amplitude of top pin cushion and the amplitude of bottom pin cushion in order to compensate for any non-linearity in the pin cushion distortion. Since the red and blue images must be superimposed on to the green image, this independent control is necessary.

Figure 15:
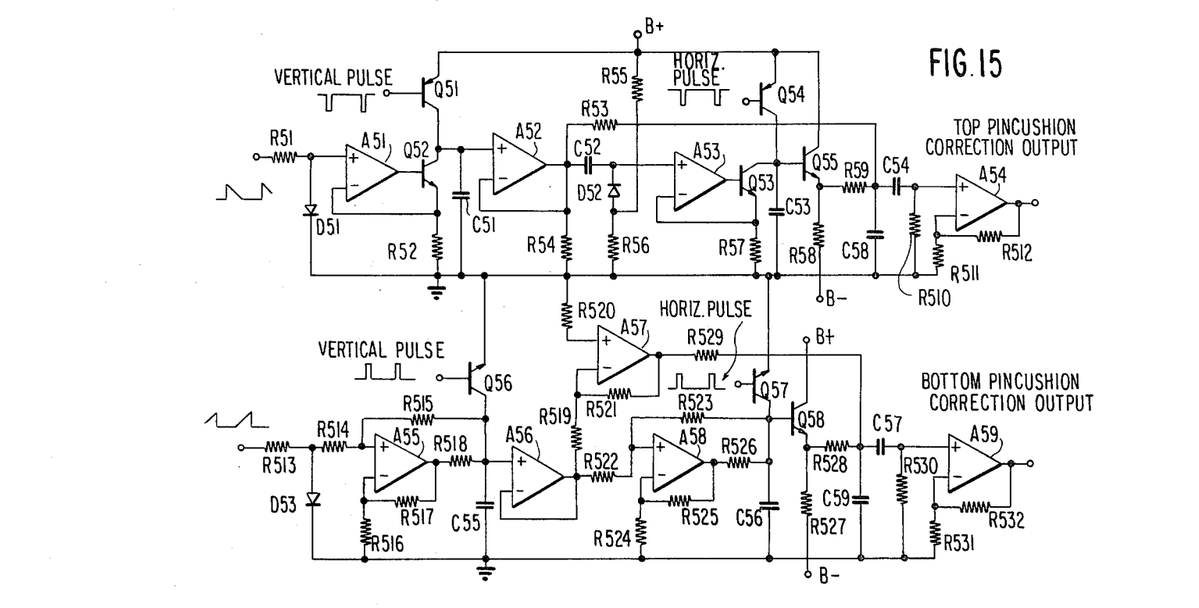
FIG. 15 is a schematic diagram of the top and bottom pin cushion correction circuit.

The circuit for providing top and bottom pin cushion correction is shown in FIG. 15 which is also divided into two parts. The first part is the correction for top pin cushion only, and the second part is the correction for bottom pin cushion only. The division allows independent control over the first half of the vertical sweep and the second half of the vertical sweep. The wave forms for accomplishing top and bottom pin cushion correction are developed starting with the wave forms of FIGS. 9 and 11 generated in the trapezoidal correction circuit.

Figure 9:
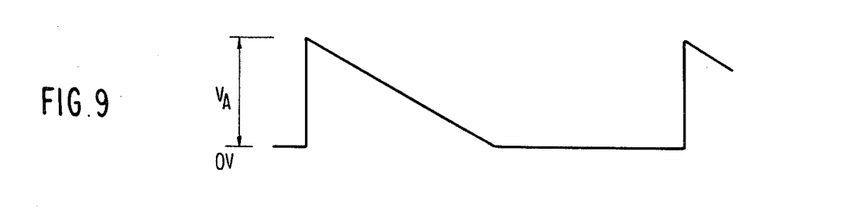

It was determined through experiment that a very smooth transition at the center of the vertical sweep in the pin cushion correction wave form of FIG. 27 is required in order to prevent sweep distortion at this point. As in the trapezoidal correction circuit, the wave forms of FIGS. 9 and 11 are used as the modulating wave forms for developing pin cushion correction. However, these wave forms have a sharp transition at the center of the vertical sweep. The process of integration and amplification, which is described later, causes this transition to be amplified. Therefore, it is necessary to develop the circuits to smooth out this transition before these wave forms can be used to modulate a horizontal parabola.

Figure 17:
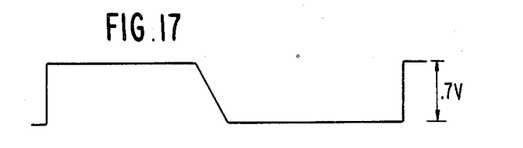
FIGS. 17-27 are wave form diagrams illustrating the operation of the circuit in FIGS. 15 and 16.
Figure 18:
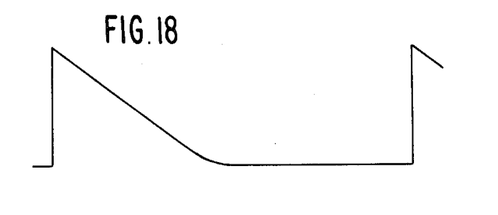

For top pin cushion correction, the wave form of FIG. 9 is used. With reference to FIG. 15, this signal is applied to resistor R51. Diode D51 is used to clip the wave form of FIG. 9, resulting in the wave form of FIG. 17. This signal is then applied to the input of a current sink composed of operational amplifier A51, transistor Q52 and resistor R52. Transistor Q51 charges capacitor C51 after each vertical interval, and transistor Q52 discharges capacitor C51 according to the input of operational amplifier A51. During the positive DC portion of FIG. 17, capacitor C51 is discharged in a linear saw tooth. During the saw tooth portion of FIG. 17, which is a small period around the center of the vertical sweep, capacitor C51 is discharged parabolically to a zero slope at the center of the vertical sweep. This wave form is shown in FIG. 18 and is the modulating wave form for the top pin cushion correction. As can be seen, the difference in the wave forms of FIG. 9 and FIG. 18 is the smooth transition at the center of the vertical sweep.

Figure 19:
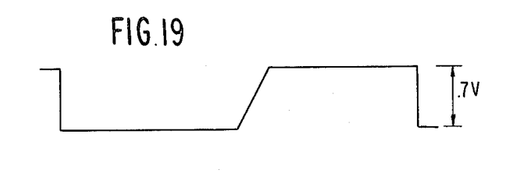

The modulating wave form for the bottom pin cushion correction is developed in a similar manner. The wave form of FIG. 11 is clipped through resistor R513 by diode D53 resulting in the wave form of FIG. 19. This clipped wave form is then applied to the current source made up of operational amplifier A55 and resistors R514, R515, R516, R517, and R518. During the first half of the vertical sweep, capacitor C55 remains discharged by transistor Q56. At the center of the vertical sweep, capacitor C55 begins charging parabolically due to the saw tooth portion of FIG. 19. When the DC level of FIG. 19 is reached, capacitor C55 begins charging linearlly resulting in the wave form of FIG. 20. This is the modulating wave form for the bottom pin cushion correction.

Figure 21:
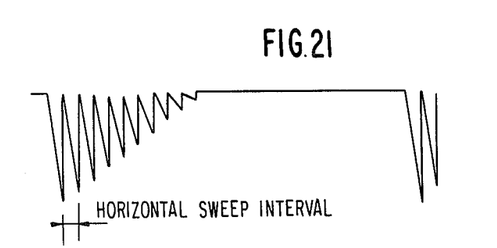
Figure 22:
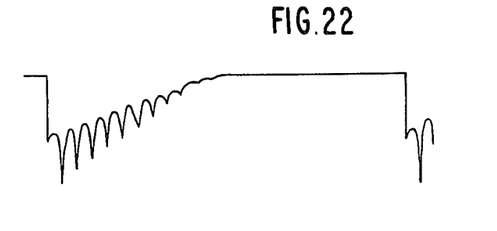
Figure 23:
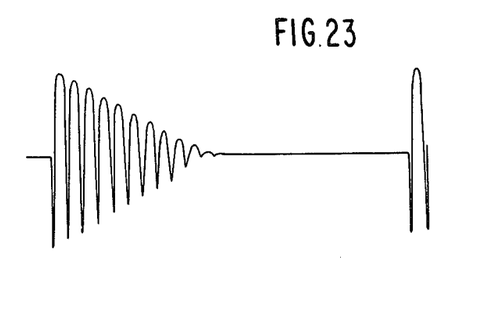

The modulating wave form for the top pin cushion correction shown in FIG. 18 must be clamped to ground before it can be used to develop the modulated output. This is accomplished by applying the signal at the collector of transistor Q52 to a voltage follower comprising operational amplifier A52. The zero slope portion of the output of operational amplifier A52 is then clamped to ground through the clamping network composed of capacitor C52, diode D52, and resistors R55 and R56. The signal at the cathode of diode D52 is the modulating wave form of FIG. 18. This wave form is applied to the current sink made up of operational amplifier A53, transistor Q53 and resistor R57. Capacitor C53 is charged to the B+ supply voltage through transistor Q54 at the end of each horizontal sweep interval. Capacitor C53 is then discharged through transistor Q53 resulting in a modulated linear horizontal saw tooth. It will be appreciated that the modulating technique used here is the same as in the case of the trapezoidal correction circuit described earlier. The modulated wave form at the collector of transistor Q53 is shown in FIG. 21. This wave form must now be integrated in order to obtain a modulated horizontal parabola. This is done using resistor R59 and capacitor C58 as an RC integrator. The output of capacitor C53 is supplied to this RC integrator by an emitter follower comprising transistor Q55 and resistor R58. When the proper time constant is used to obtain the required horizontal parabola, the modulating wave form, which is at the vertical frequency, is essentially unaffected by the integration. The resulting wave form is shown in FIG. 22. The integration process attenuates the modulated wave form to such a degree that it must be amplified in order to be useful. The amplitude of the horizontal parabola of FIG. 22 is approximately fifty times smaller than the modulating wave form in the same figure. This requires that the modulating wave form, the modified vertical saw tooth, be removed before the modulated wave form can be amplified. Since the difference between the vertical frequency and the horizontal frequency is only a factor of 262.5, simple RC filtering cannot be used. The method used in the circuit of FIG. 15 is to invert the modulating wave form and add it to the modulated wave form resulting in the wave form of FIG. 23. Since the output of operational amplifier A52 is the inverse of the modulated wave form of FIG. 22, it is added to the modulated wave form through resistor R53. The wave form of FIG. 23 is then coupled to the + input of operational amplifier A54 by means of coupling capacitor C54. Operational amplifier A54 amplifies the wave form of FIG. 23 to produce the wave form which will correct top pin cushion distortion.

Figure 20:
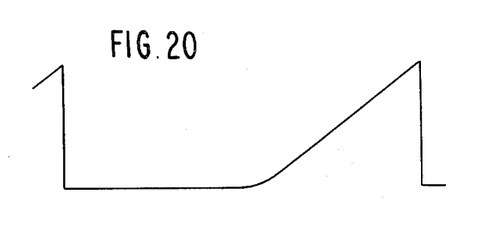
Figure 24:
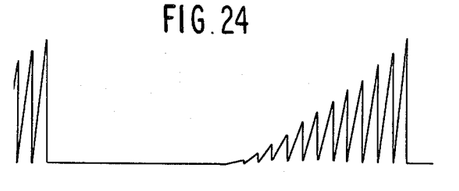
Figure 25:
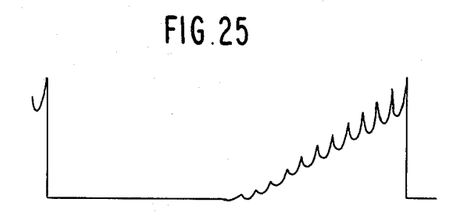
Figure 26:
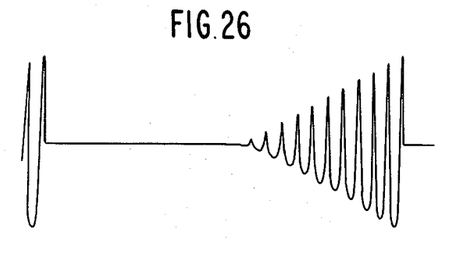

The method of developing the wave form for bottom pin cushion distortion is identical. The modulating wave form of FIG. 20 is applied to the current source composed of operational amplifier A58 and resistors R522, R523, R524, R525, and R526 by means of operational amplifier A56 which is connected as a voltage follower. This current source charges capacitor C56 in a horizontal saw tooth, while transistor Q57 discharges capacitor C56 after each horizontal interval. The resulting wave form is that of FIG. 24. This wave form is then integrated by resistor R528 and capacitor C59 resulting in the wave form of FIG. 25. The modulating wave form of FIG. 20 is inverted in operational amplifier A57 and added to the wave form in FIG. 25, resulting in the wave form of FIG. 26. This wave form is then amplified in operational amplifier A59 whose output is the wave form which will correct bottom pin cushion distortion.

Figure 16:
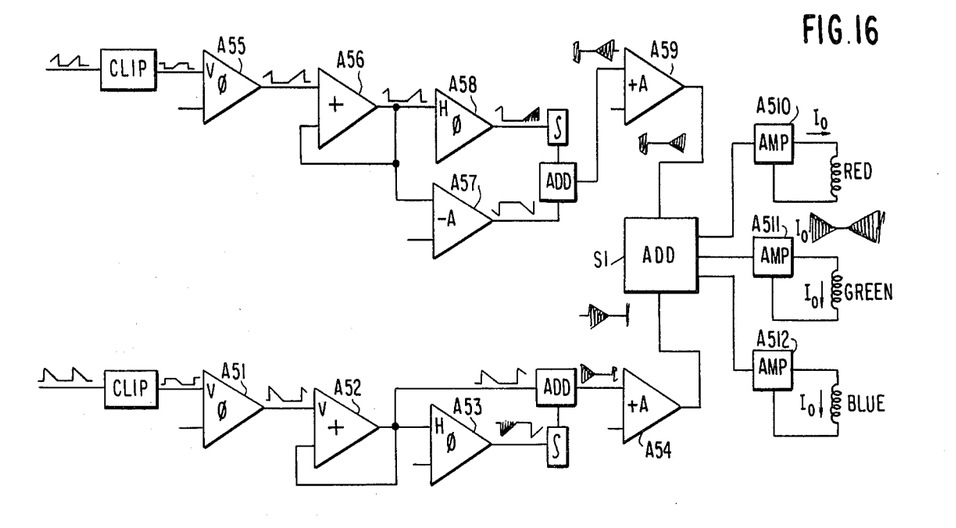
FIG. 16 is a block diagram of the circuit of FIG. 15 showing the combining of the top and bottom pin cushion correction outputs for driving the pre-deflection yokes.

As shown in FIG. 16, the two wave forms from amplifiers A54 and A59 are resistively added in a summing circuit S1. The output of the summing circuit S1 is supplied to current amplifiers A510, A511 and A512 to drive the pre-deflection yokes.

The required wave form for correcting side pin cushion distortion should be a horizontal saw tooth modulated by a parabola at the vertical frequency. This wave form, when driven into the proper windings of the pre-deflection yokes, will correct side pin cushion distortion. It is desireable, again, to have independent control over the top side pin cushion correction and the bottom side pin cushion correction in order to compensate for any non-linearity in the pin cushion distortion. Again, since the red and blue images of the three tube projection system must be superimposed on the green image, this independent control is necessary.

The side pin cushion correction circuit is also divided into two parts. The first part is the correction for top side pin cushion, and the second part is the correction for bottom side pin cushion. This division allows independent control over the first half of the vertical sweep and the second half of the vertical sweep. This independent control is accomplished in the same manner as in the trapezoidal distortion correction circuit and start with the wave forms of FIGS. 9 and 11.

Figure 28:
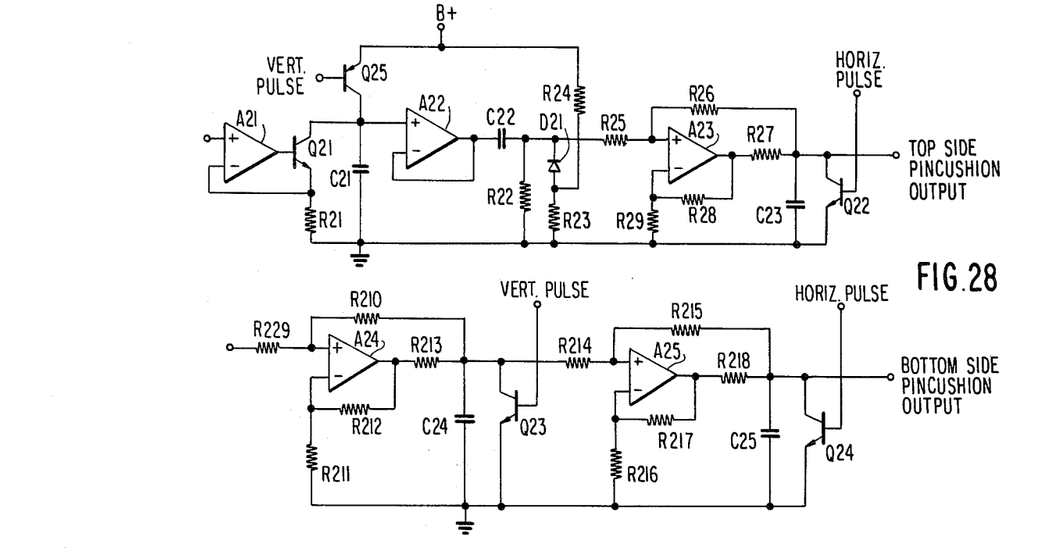
FIG. 28 is a schematic diagram of the side pin cushion correction circuit.
Figure 30:
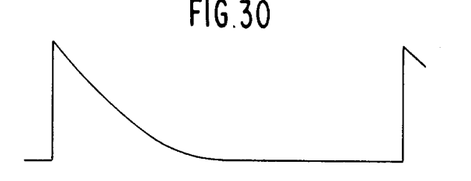
FIGS. 30-34 are wave form diagrams illustrating the operation of the circuit in FIGS. 28 and 29.

The modulating wave form for the correction of top side pin cushion is shown in FIG. 30. It is the vertical parabola described above for the first half of the vertical sweep and is generated in the folowing manner. With reference to FIG. 28, the vertical saw tooth of FIG. 9 is applied to the current source made up of operational amplifier A21, transistor Q21 and resistor R21. Capacitor C21 is charged to the B+ supply voltage after each vertical sweep interval by transistor Q25. Transistor Q21 then discharges capacitor C21 parabolically since the input to operational amplifier A21 is a saw tooth. This results in the shape of the wave form of FIG. 30 at the collector of transistor Q21. This signal is then supplied through a voltage follower comprising operational amplifier A22 to a clamping network comprising capacitor C22, resistor R22, diode D21, resistor R24, and resistor R23. This clamping network clamps the zero slope portion of the wave form to ground to provide the modulating wave form of FIG. 30 at the cathode of diode D21.

Figure 32:
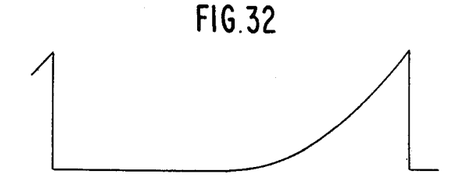

The modulating wave form for the bottom side pin cushion is generated similarly. The vertical saw tooth of FIG. 11 is applied to the current source made up of operational amplifier A24 and resistors R229, R210, R211, R212, and R213. This current source charges capacitor C24 parabolically due to the saw tooth input to operational amplifier A24. Transistor Q23 discharges capacitor C24 after each vertical sweep interval. This results in the modulating wave form for the bottom side pin cushion at the collector of transistor Q23 as shown in FIG. 32.

Figure 31:
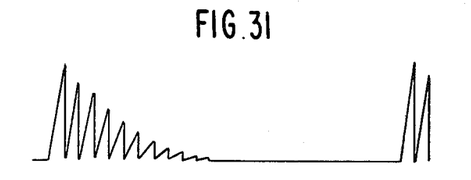

The modulated wave forms for correcting top and bottom side pin cushion are generated identically. The modulating wave form for top side pin cushion is applied to the current source made up of operational amplifier A23 and resistors R25, R26, R27, R28, and R29. The capacitor C23 is charged by this current source during each horizontal sweep interval. A constant current charge of capacitor C23 is required in order to have a linear saw tooth of voltage across capacitor C23. In order for the current source associated with operational amplifier A23 to be a constant current, the input to operational amplifier A23 must be a constant voltage. Although the input to operational amplifier A23 is a vertical parabola, the voltage over a single horizontal sweep interval is, for all practical purposes, constant. The capacitor C23 is discharged at the end of each horizontal sweep interval by transistor Q22. This results in the modulated wave form of FIG. 31. This is the wave form which will correct top side pin cushion distortion when applied to the proper windings of the pre-deflection yokes.

Figure 33:
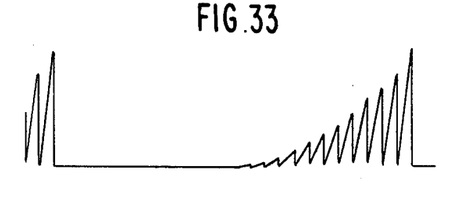

The modulated wave form for bottom side pin cushion is generated exactly the same as for top side pin cushion. More specifically, the wave form of FIG. 32 is applied to the current source made up of operational amplifier A25 and resistors R214, R215, R216, R217, and R218. Capacitor C25 is charged by this current source during each horizontal sweep interval and is discharged by transistor Q24 at the end of each horizontal sweep interval. This results in the modulated wave form of FIG. 33.

Figure 29:
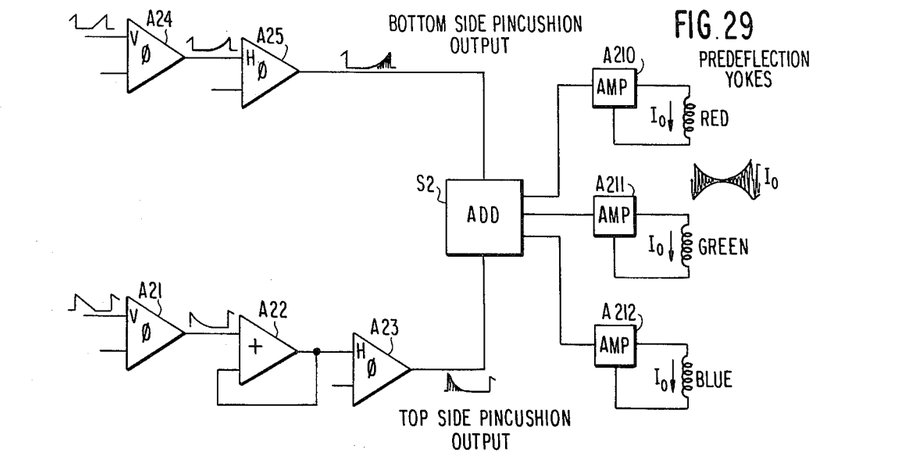
FIG. 29 is a block diagram of the circuit in FIG. 28 showing the combining of the top and bottom side pin cushion correction outputs for driving the pre-deflection yokes.
Figure 34:
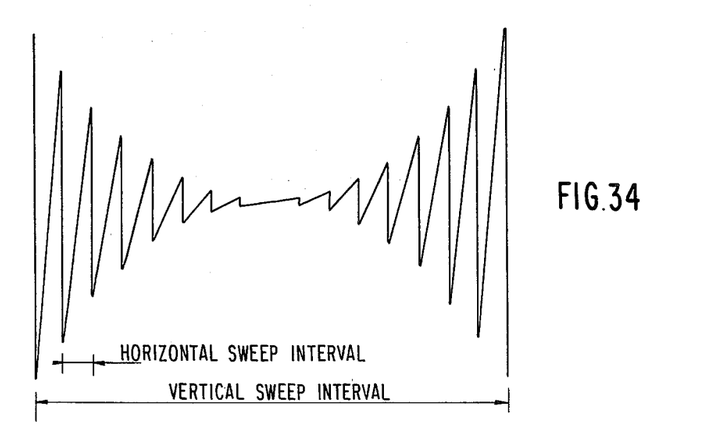

As shown in FIG. 29, the wave forms from operational amplifiers A23 and A25 are combined in a resistive adder S2 to produce the complete correction wave form for side pin cushion shown in FIG. 34. The output of resistive adder S2 is supplied to current amplifiers A210, A211 and A212 which drive the pre-deflection yokes.

The optical distortion along the horizontal axis shown in FIG. 1 is corrected by means of the horizontal width and linearity correction circuit. Since this circuit is directed to the correction of horizontal width and linearity in the television sweep, these parameters should be defined. Horizontal width is the size of the displayed image in the horizontal direction. Electrically, it is the amplitude of the horizontal deflection current. Since the horizontal sweep current is a saw tooth wave form, the width can be corrected using a saw tooth wave form to either add to or subtract from the means of horizontal deflection. Horizontal linearity is the relative change in scan amplitudes of equal time intervals of the horizontal period. It has been found through experiment that the most non-linearity of the horizontal sweep occurs at the beginning and the end of the horizontal sweep. Therefore, the correction wave form for horizontal linearity should have its greatest effect at these points. The wave form which most nearly accomplishes this is a horizontal parabola.

In a television sweep system, horizontal width and linearity can be adjusted by modifying the deflection yoke current with inductors and capacitors. However, tolerances and non-linearity of these components make it difficult if not impossible to obtain consistent results. In a three picture tube projection system, the width and linearity of all three pictures must be identical so that the images can be superimposed, resulting in a converged picture. In order to have the greatest amount of control over width and linearity, it is desireable to be able to control these parameters on both sides of the center of the horizontal sweep independently.

Figure 35:
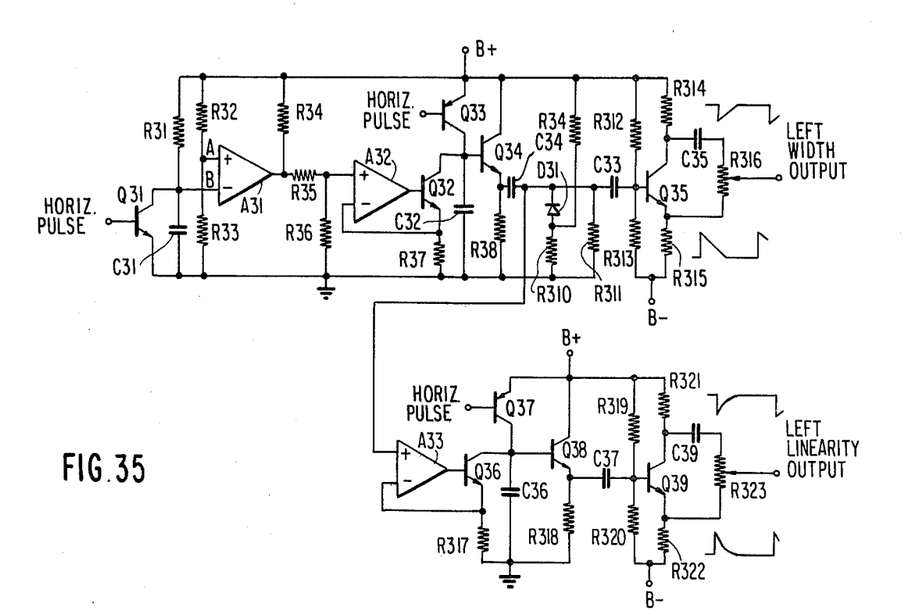
FIG. 35 is a schematic diagram of the left width and linearity correction circuit.
Figure 38:
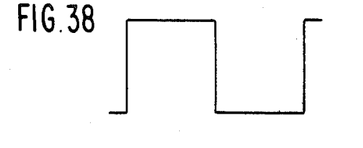
FIGS. 38-44 are wave form diagrams illustrating the operation of the circuits in FIGS. 35, 36 and 37.
Figure 39:
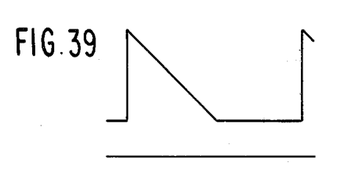

Referring to FIG. 35, the generation of left width correction and left linearity correction will first be described. A square wave at the horiazontal frequency is generated at the output of operational amplifier A31 operating as a comparator. Capacitor C31 is changed through resistor R31 producing a horizontal saw tooth. Capacitor C31 is discharged after every horizontal interval by transistor Q31. Resistors R32 and R33, connected as a voltage divider between the source of B+ voltage and ground, bias the + input to operational amplifier A31 so that, at the center of the horizontal sweep, the + and − inputs of the operational amplifier A31 are equal. At this time, the output of operational amplifier A31 switches from B+ to ground. This creates the square wave shown in FIG. 38 at the output of operational amplifier A31. This square wave is applied to the input of a current sink made up of operational amplifier A32, transistor Q32 and resistor R37. Capacitor C32 is charged to the B+ supply voltage through transistor Q33 after each horizontal sweep interval. Capacitor C32 is then discharged linearly by transistor Q32 to produce the wave form shown in FIG. 39. At the center of the horizontal sweep, there is no further discharge of capacitor C32 since the input to operational amplifier A32 is zero or ground. This is the wave form which will adjust the width from the start to the center of the horizontal sweep. In order to be able to adjust the width in either direction, the output of transistor Q32 is fed via an emitter follower comprising transistor Q34 and resistor R38 to a phase splitter made up of resistor R312, resistor R313, transistor Q35, resistor R314, resistor R315, capacitor C35, and potentiometer R316. The outputs of the collector and emitter of transistor Q35 are equal in amplitude but opposite in phase. When the potentiometer R316 is in the center of its range, there is no output for width correction. When potentiometer R316 is at either end of its range, the width correction is at maximum increase or maximum decrease depending on which end to which the potentiometer is turned.

Figure 40:
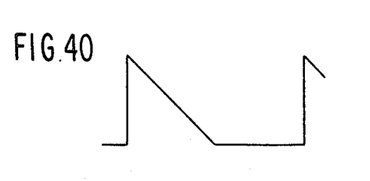
Figure 41:
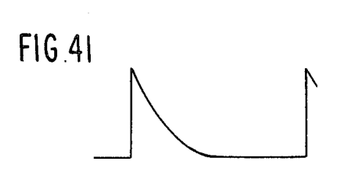

The wave form for the adjustment of left linearity is generated using the wave form for width correction. The wave form of FIG. 39 must be clamped to ground during its zero slope portion. This is done by the clamping network made up of capacitor C34, diode D31, resistor R310, and resistor R311. The output of the cathode of diode D31 is the wave form shown in FIG. 40. This wave form is applied to the input of operational amplifier A33, which, along with transistor Q36 and resistor R317, make up a current sink. Transistor Q37 charges capacitor C36 to the B+ supply voltage after each horizontal interval. Transistor Q36 discharges capacitor C36 parabolically since the input to operational amplifier A33 is a saw tooth. The output of transistor Q36 is the wave form shown in FIG. 41 and is the left linearity correction voltage. As in the case for the left width correction, this wave form is applied via an emitter follower comprising transistor Q38 and resistor R318 to a phase splitter made up of resistor R321, resistor R322, transistor Q39, resistor R319, resistor R320, capacitor C39, and potentiometer R323. When the potentiometer R323 is in the center of its range, there is no output for left linearity correction.

Figure 36:
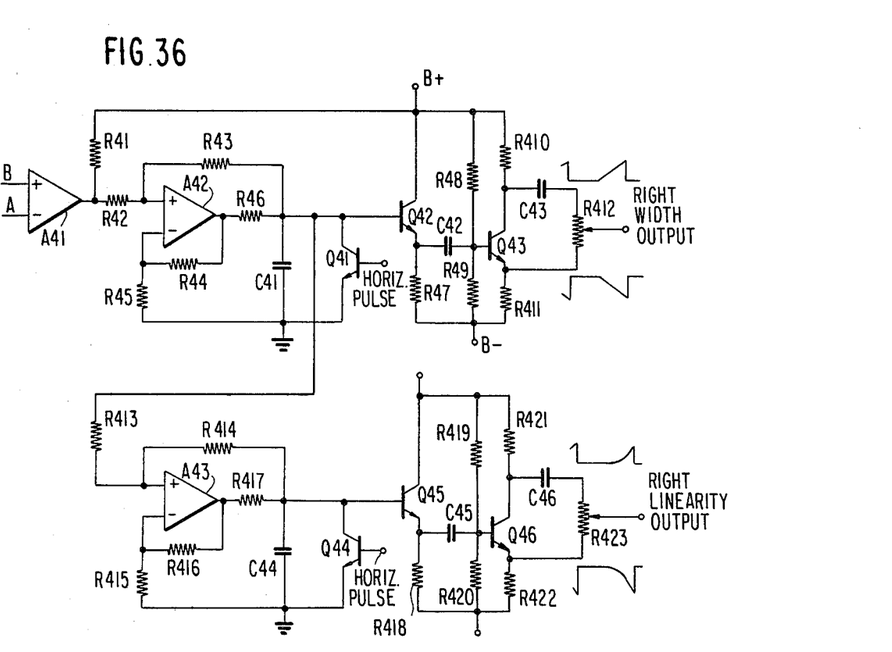
FIG. 36 is a schematic diagram of the right width and linearity correction circuit.
Figure 42:
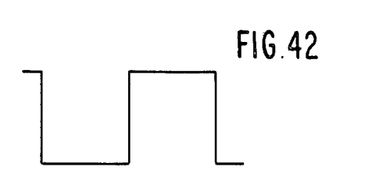

As shown in FIG. 36, the right width and linearity are accomplished in a similar manner. A square wave 180° out of phase with the square wave for the left side of the picture is generated for the right width and linearity. This square wave shown in FIG. 42 is generated by amplifier A41 and applied to the current source comprising operational amplifier A42 and resistors R42, R43, R44, R45, and R46. Capacitor C41 is charged linearly during the second half of the horizontal sweep by this current source and is discharged by transistor Q41 after each horizontal interval. This results in the wave form of FIG. 43 which is the correction voltage for right width. This wave form is applied to the phase splitter comprising transistor Q43, resulting in the ability to increase or decrease the right width.

Figure 43:
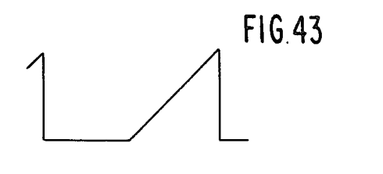
Figure 44:
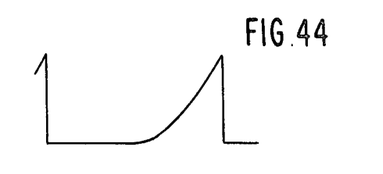

The wave form of FIG. 43 is used to generate the right linearity correction wave form. This wave form is applied to the current source made up of operational amplifier A43 and resistors R413, R414, R415, R416, and R417. This current source charges capacitor C44 parabolically since the input to the operational amplifier A43 is a saw tooth. Transistor Q44 discharges capacitor C44 after each horizontal sweep interval. The output of capacitor C44 is the correction voltage for right linearity as shown in FIG. 44 and is applied to the phase splitter comprising transistor Q46 in order to achieve right linearity correction in either direction.

Figure 37:
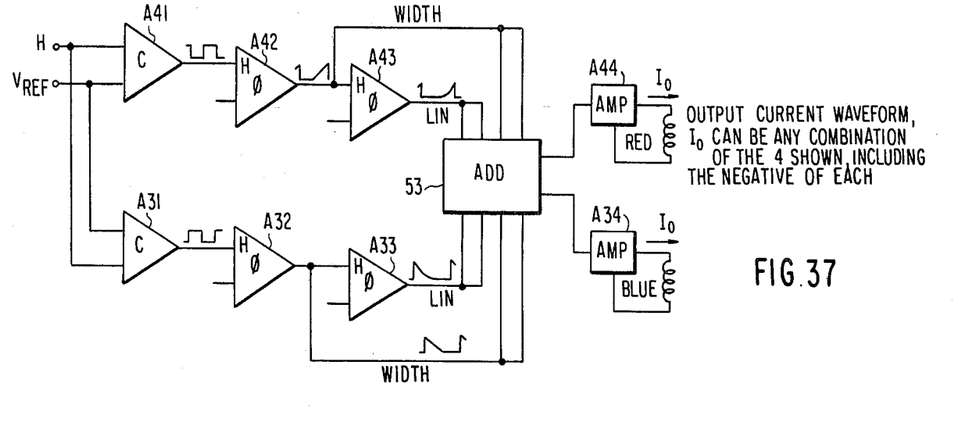
FIG. 37 is a block diagram of the circuits of FIGS. 35 and 36 showing combining left width, right width, left linearity, and right linearity correction outputs for driving the pre-deflection yokes.

As shown in FIG. 37 these four wave forms for correcting width and linearity form operational amplifiers A32, A33, A42, and A43 are resistively added together in summing network S3. The outputs of the summing network S3 are amplified by current amplifiers A34 and A44 and fed through the proper windings of the pre-deflection yokes.

As will be appreciated by those skilled in the art, the modulation techniques used in the correction circuits for trapezoidal and pin cushion distortion require no bias current adjustment as is the case in most conventional modulation circuits. Moreover, the correction circuits of the invention require a relatively small amount of power to accomplish their purpose. All of the correction adjustments are made independently of the deflection yoke current. Because the circuits allow for independent correction of distortions in the top and bottom and right and left portions of the projected television image, accurate convergence of the three projected television images may be easily accomplished.

I claim:

1. In a projection television of the type having three picture tubes arranged side by side on a horizontal axis, said picture tubes separately displaying red, green and blue information of a color television picture, a separate projection lens adjacent the face plate of each picture tube, and a remote screen on which are projected the superposed images generated on the face plates of said picture tubes, each of said picture tube being provided with a main deflection yoke for deflecting the generated cathode ray beam to produce picture images, the improvement wherein each of said pisture tubes is additionally provided with a pre-deflection yoke and correction circuits for driving the pre-deflection yokes of said picture tubes, said correction circuits comprising a trapezoidal correction circuit, a top and bottom pin cushion correction circuit, a side pin cushion correction circuit, and a horizontal width and linearity correction circuit.

2. The improvement according to claim 1 wherein said trapezoidal correction circuit generates correction wave forms comprised of a saw tooth at the horizontal frequency whose amplitude is modulated by a saw tooth at the vertical frequency.

3. The improvement according to claim 2 wherein said trapezoidal correction circuit allows independent correction of the top and bottom of the projected image.

4. The improvement according to claim 1 wherein said top and bottom pin cushion correction circuit generates correction wave forms comprised of a parabola at the horizontal frequency whose amplitude is modulated by a saw tooth at the vertical frequency.

5. The improvement according to claim 4 wherein said top and bottom pin cushion correction circuit allows independent control for top pin cushion correction and bottom pin cushion correction.

6. The improvement according to claim 1 wherein said side pin cushion correction circuit generates correction wave forms comprised of a saw tooth at the horizontal frequency modulated by a parabola of the vertical frequency.

7. The improvement according to claim 6 wherein said side pin cushion correction circuit allows independent control for top side pin cushion correction and bottom side pin cushion correction.

8. The improvement according to claim 1 wherein said horizontal width and linearity correction circuits generate correction wave forms comprised of saw tooths and parabolas at the horizontal frequency.

9. The improvement according to claim 8 wherein said horizontal width and linearity correction circuits allow independent control for left and right width and left and right linearity.

10. In a projection television of the type having three picture tubes arranged side by side on a horizontal axis, said picture tubes separately displaying red, green and blue information of a color television picture, a separate projection lens adjacent the face plate of each picture tube, and a remote screen on which are projected the superposed images generated on the face plates of said picture tubes, each of said picture tubes being provided with a main deflection yoke for deflecting the generated cathode ray beam to produce picture images, the improvement wherein each of said picture tubes is additionally provided with a pre-deflection yoke and a correction circuit for driving the pre-deflection yokes of said picture tubes, said correction circuit being a trapezoidal correction circuit and comprising:
first means for generating a linearly decreasing voltage wave form during the first half of the vertical sweep,
second means for generating a linearly increasing voltage wave form during the second half of the vertical sweep,
first modulating means for generating a saw tooth wave form at the horizontal frequency modulated by said linearly decreasing wave form,
second modulating means for generating a saw tooth wave form at the horizontal frequency modulated by said linearly increasing wave form, and
means for combining the outputs of said first and second modulating means and applying a corresponding current to an appropriate one of said pre-deflection yokes.

11. In a projection television of the type having three picture tubes arranged side by side on a horizontal axis, said picture tubes separately displaying red, green and blue information of a color television picture, a separate projection lens adjacent the face plate of each picture tube, and a remote screen on which are projected the superposed images generated on the face plates of said picture tubes, each of said picture tubes being provided with a main deflection yoke for deflecting the generated cathode ray beam to produce picture images, the improvement wherein each of said picture tubes is additionally provided with a pre-deflection yoke and a correction circuit for driving the pre-deflection yokes of said picture tubes, said correction circuit being a trapezoidal correction circuit and comprising:

means for generating a square wave at the vertical sweep frequency,
a first constant current sink,
a first capacitor and a first charging means for charging said first capacitor at the end of each vertical sweep interval, said first capacitor being discharged by said first constant current sink during the first half of the vertical sweep in response to said square wave,
a second constant current sink,
a second capacitor and second charging means for charging said second capacitor after each horizontal sweep interval, said second capacitor being discharged by said second constant current sink in response to the output voltage from said first capacitor,
means for inverting said square wave,
a first current source,
a third capacitor charged from said first current source during the second half of the vertical sweep,
first discharging means for discharging said third capacitor at the end of each vertical sweep,
a second current source,
a fourth capacitor charged from said second current source in response to the output voltage from said third capacitor,
second discharging means for discharging said fourth capacitor after each horizontal interval, and
means for combining the output voltages of said second and fourth capacitors and applying a corresponding current to an appropriate one of said pre-deflection yokes.

12. In a projection television of the type having three picture tubes arranged side by side on a horizontal axis, said picture tubes separately displaying red, green and blue information of a color television picture, a separate projection lens adjacent the face plate of each picture tube, and a remote screen on which are projected the superposed images generated on the face plates of said picture tubes, each of said picture tubes being provided with a main deflection yoke for deflecting the generated cathode ray beam to produce picture images, the improvement wherein each of said picture tubes is adddtionally provided with a pre-deflection yoke and a correction circuit for driving the pre-deflection yokes of said picture tubes, said correction circuit being a top and bottom pin cushion correction circuit comprising:

first means for generating a linearly decreasing voltage wave form during the first half of the vertical sweep,
second means for generating a linearly increasing voltage wave form during the second half of the vertical sweep,
first smoothing means for smoothing the transition of said linearly decreasing voltage wave form at the center of the vertical sweep,
second smoothing means for smoothing the transition of said linearly increasing voltage wave form at the center of the vertical sweep,
first modulating means for generating a saw tooth wave form at the horizontal frequency modulated by the output of said first smoothing means,
second modulating means for generating a saw tooth wave form at the horizontal frequency modulated by the output of said second smoothing means,
first integrator means for integrating the difference in the outputs of said first smoothing means and said first modulating means,
second integrator means for integrating the difference in the outputs of said second smoothing means and said second modulating means, and
means for combining the outputs of said first and second integrator means and applying a corresponding current to said pre-deflection yokes.

13. In a projection television of the type having three picture tubes arranged side by side on a horizontal axis, said picture tubes separately displaying red, green and blue information of a color television picture, a separate projection lens adjacent the face plate of each picture tube, and a remote screen on which are projected the superposed images generated on the face plates of said picture tubes, each of said picture tubes being provided with a main deflection yoke for deflecting the generated cathode ray beam to produce picture images, the improvement wherein each of said picture tubes is additionally provided with a pre-deflection yoke and a correction circuit for driving the pre-deflection yokes of the picture tubes, said correction circuit being a top and bottom pin cushion correction circuit and comprising:

means for generating a square wave at the vertical sweep frequency,
a first constant current sink,
a first capacitor and a first means for charging said first capacitor at the end of each vertical sweep, said first capacitor being discharged by said first constant current sink during the first half of the vertical sweep in response to said square wave,
means for inverting said square wave,
a first current source responsive to the inverted square wave,
a second capacitor charged from said first current source during the second half of the vertical sweep,
first discharging means for discharging said second capacitor at the end of each vertical sweep,
first clipping means responsive to the output voltage from said first capacitor for producing a clipped saw tooth voltage,
a second constant current sink,
a third capacitor and means for charging said third capacitor after each vertical sweep interval, said third capacitor being discharged by said second current sink in response to said clipped saw tooth wave form from said first clipping means,
second clipping means reponsive to the voltage output from said second capacitor for producing a clipped saw tooth wave form,
a second current source, a fourth capacitor charged by said second current source in response to the clipped saw tooth wave form from said second clipping means, second discharging means for discharging said fourth capacitor at the end of each vertical sweep interval, a third constant current sink, a fifth capacitor and means for charging said fifth capacitor at the end of each horizontal sweep interval, said fifth capacitor being discharged by said third constant current sink in response to the output of said third capacitor, first integrator means for integrating the difference of the output of said third capacitor and said fifth capacitor to produce a top pin cushion correction output, a third current source responsive to the output of said fourth capacitor, a sixth capacitor charged by said third current source, means for discharging said sixth capacitor after each horizontal interval, and second integrator means for integrating the difference of the output of said fourth and sixth capacitors to produce a bottom pin cushion correction output, and means for combining the top pin cushion correction output from said fifth capacitor and the bottom pin cushion correction output from said sixth capacitor and applying a corresponding current to said predeflection yokes.

14. In a projection television of the type having three picture tubes arranged side by side on a horizontal axis, said picture tubes separately displaying red, green and blue information of a color television picture, a separate projection lens adjacent the face plate of each picture tube, and a remote screen on which are projected the superposed images generated on the face plates of said picture tubes, each of said picture tubes being provided with a main deflection yoke for deflecting the generated cathode ray beam to produce picture images, the improvement wherein each of said picture tubes is additionally provided with a pre-deflection yoke and a correction circuit for driving the pre-deflection yokes of said picture tubes, said correction circuit being a side pin cushion correction circuit comprising:

first means for generating a linearly decreasing voltage wave form during the first half of the vertical sweep, second means for generating a linearly increasing voltage wave form during the second half of the vertical sweep, first conversion means for converting said linearly decreasing voltage to a parabolically decreasing voltage, second conversion means for converting said linearly increasing voltage to a parabolically increasing voltage, first modulation means for generating a saw tooth wave form at the horizontal frequency modulated by said parabolically decreasing voltage, second modulation means for generating a saw tooth wave form at the horizontal frequency modulated by said parabolically increasing voltage, and means for combining the outputs of said first and second modulation means and applying a corresponding current to said pre-deflection yokes.

15. In a projection television of the type having three picture tubes arranged side by side on a horizontal axis, said picture tubes separately displaying red, green and blue information of a color television picture, a separate projection lens adjacent the face plate of each picture tube, and a remote screen on which are projected the superposed images generated on the face plates of said picture tubes, each of said picture tubes being provided with a main deflection yoke for deflecting the generated cathode ray beam to produce picture images, the improvement wherein each of said picture tubes is additionally provided with a pre-deflection yoke and a correction circuit for driving the pre-deflection yokes of said picture tubes, said correction circuit being a side pin cushion correction circuit and comprising:

means for generating a square wave at the vertical sweep frequency, a first constant current sink, a first capacitor and a first means for charging said first capacitor at the end of each vertical sweep, said first capacitor being discharged by said first constant current sink during the first half of the vertical sweep in response to said square wave, means for inverting said square wave, a first current source responsive to the inverted square wave, a second capacitor charged from said first current source during the second half of the vertical sweep, first discharging means for discharging said second capacitor at the end of each vertical sweep, a second constant current sink, a third capacitor and second means for charging said third capacitor at the end of each vertical sweep, said third capacitor being discharged by said second constant current sink in response to the output of said first capacitor, a second current source, a fourth capacitor charged by said second current source in response to the output of said second capacitor, second discharging means for discharging said fourth capacitor at the end of each vertical sweep interval, a third current source, a fifth capacitor charged by said third current source in response to the output of said third capacitor to produce a top side pin cushion correction output, third discharging means for discharging said fifth capacitor at the end of each horizontal sweep interval, a fourth current source, a sixth capacitor charged by said fourth current source in response to the output of said fourth capacitor to produce a bottom side pin cushion correction output, fourth discharging means for discharging said sixth capacitor at the end of each horizontal sweep interval, and means for combining the top side pin cushion correction output from said fifth capacitor and the bottom side pin cushion correction output from said sixth capacitor and applying a corresponding current to said pre-deflection yokes.

16. In a projection television of the type having three picture tubes arranged side by side on a horizontal axis, said picture tubes separately displaying red, green and blue information of a color television picture, a separate projection lens adjacent the face plate of each picture tube, and a remote screen on which are projected the superposed images generated on the face plates of said picture tubes, each of said picture tubes being provided with a main deflection yoke for deflecting the generated cathode ray beam to produce picture images, the improvement wherein each of said picture tubes is additionally provided with a pre-deflection yoke and a correction circuit for driving the pre-deflection yokes of said picture tubes, said correction circuit being a horizontal width and linearity correction circuit and comprising a left width and linearity correction circuit and a right width and linearity correction circuit, said left width and linearity correction circuit comprising:

first means for generating a first square wave at the horizontal frequency,
a first constant current sink,
a first capacitor and first means for charging said first capacitor after each horizontal sweep interval, said first capacitor being linearly discharged by said first constant current sink in response to said square wave,
a first phast splitter responsive to the output of said first capacitor for providing an output for adjusting the left width of the displayed image,
a second constant current sink,
a second capacitor and second means for charging said second capacitor after each horizontal interval, said second capacitor being discharged parabolically by said second constant current sink in response to the output of said first capacitor, and
a second phase splitter responsive to the output of said second capacitor for providing an output to adjust the left linearity of said displayed image, and said right width and linearity correction circuit comprising:

second means for generating a second square wave at the horizontal frequency 180° out of phase with said first square wave,
a first current source,
a third capacitor charged by said first current source in response to said second square wave,
first discharging means for discharging said third capacitor after each horizontal sweep interval,
a third phase splitter responsive to the output of said third capacitor for providing an output for adjusting the right width of the displayed image,
a second current source,
a fourth capacitor charged by said second current source in response to the output of said third capacitor,
second discharging means for discharging said fourth capacitor after each horizontal sweep interval,
a fourth phase splitter responsive to the output of said fourth capacitor for providing an output to adjust the right linearity of said displayed image, and
means for combining the outputs of said first, second, third, and fourth phase splitters and applying corresponding currents to appropriate ones of said pre-deflection yokes.

* * * * *